Nov. 7, 1961 — H. J. WILLIAMS — 3,007,303
COMPRESSOR PRESSURE MODIFIED FUEL SCHEDULE FOR AN AFTERBURNER
Filed July 8, 1955 — 3 Sheets-Sheet 1

INVENTOR.
HOWARD J. WILLIAMS
BY J. C. Wiessler
ATTORNEY

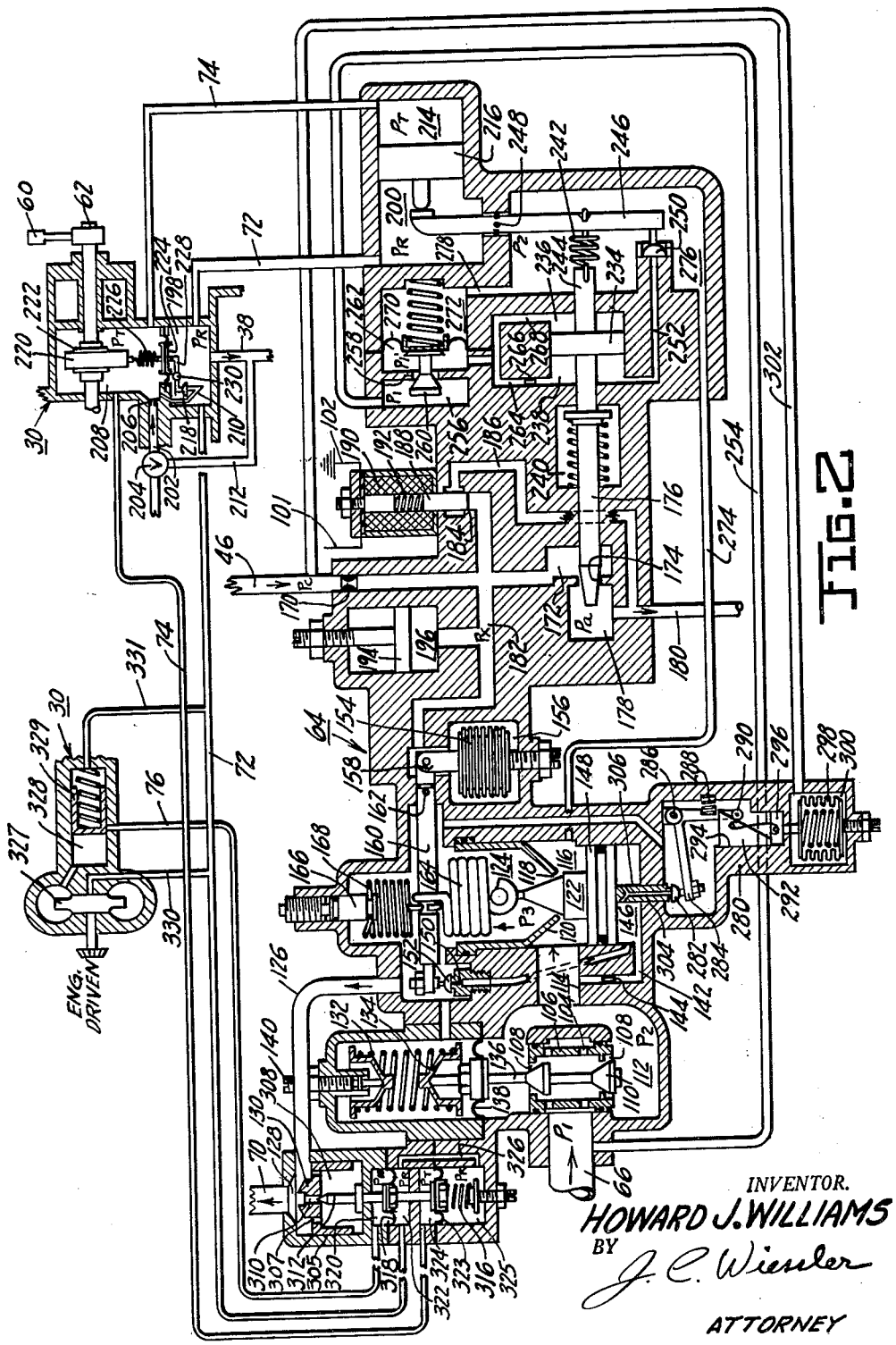

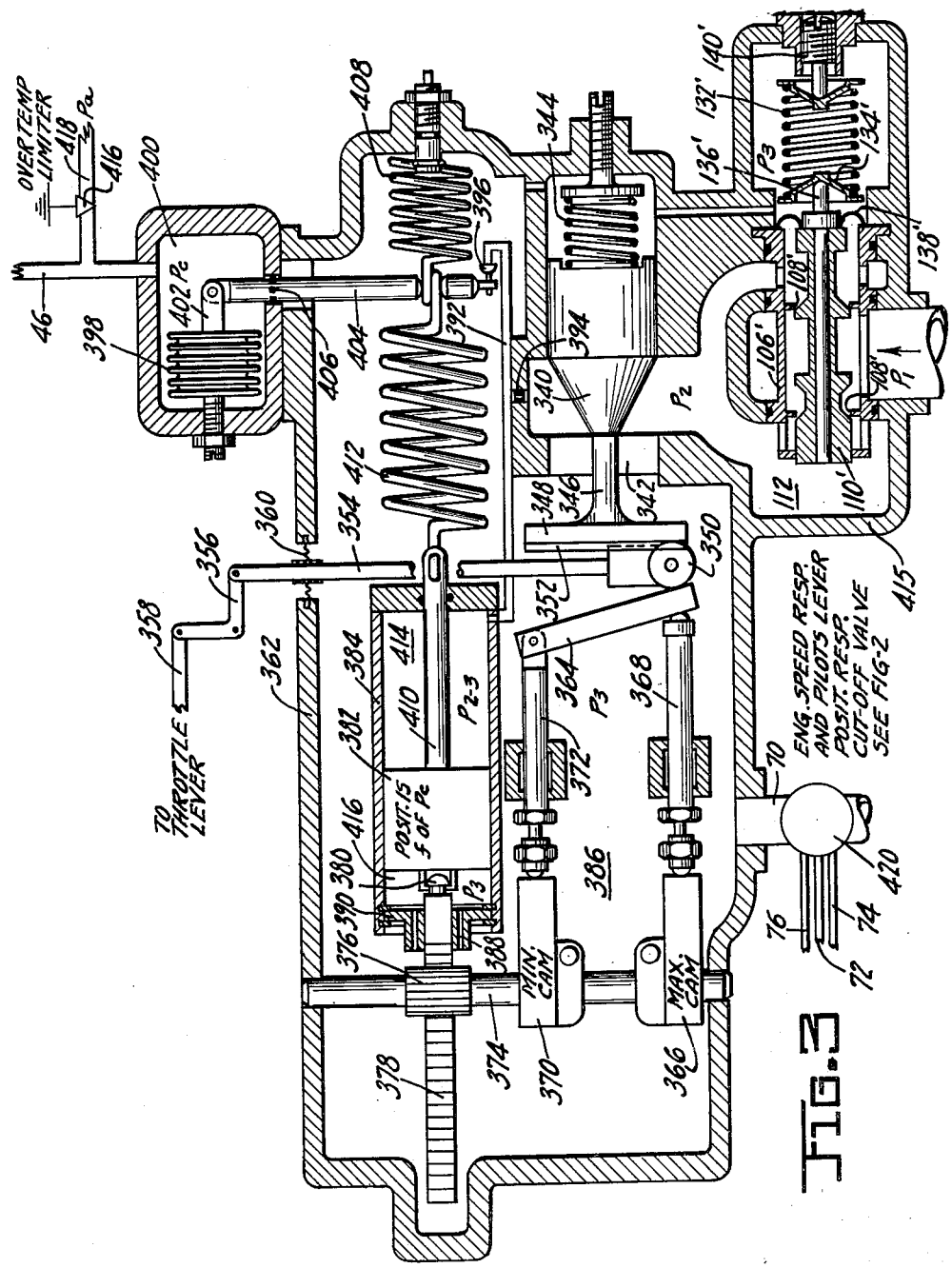

3,007,303
COMPRESSOR PRESSURE MODIFIED FUEL SCHEDULE FOR AN AFTERBURNER
Howard J. Williams, South Bend, Ind., assignor to The Bendix Corporation, a corporation of Delaware
Filed July 8, 1955, Ser. No. 520,722
21 Claims. (Cl. 60—35.6)

This invention relates to gas turbine engines for aircraft and is particularly concerned with means for obtaining thrust augmentation in such engines by burning fuel in the tailpipe section thereof.

An object of the present invention is to provide means for varying the fuel flow to the afterburner as a function of the mass or quantity of unburned air flowing into the tailpipe.

Another object of this invention is to provide engine condition responsive means for controlling the quantity of fuel flowing to the tailpipe of a gas turbine engine, and means for varying the effectiveness of the condition responsive means.

Another object of this invention is to provide means for establishing an upper and a lower afterburner fuel flow limit at each value of an engine operating condition.

A further object of this invention is to provide manual control means for selecting afterburner fuel flows within variable limits which depend upon a compressor generated pressure.

A further object of this invention is to provide improved valve control means for inhibiting afterburner fuel flow prior to the existence of certain predetermined conditions of operation.

Another object of this invention is to provide improved means by which a pilot or operator can demand a change in power output.

Yet another object of this invention is to provide tailpipe temperature responsive means for limiting a fuel flow controlling compressor generated pressure.

Still another object of this invention is to generally improve the operating mechanism and characteristics of afterburner fuel controls for gas turbine engines.

Other objects and advantages will become apparent in view of the following description taken in conjunction with the drawings, wherein:

FIGURE 2 is a sectional schematic of the afterburner fuel control device shown in FIGURE 1;

FIGURE 3 is a sectional schematic view of a modification of the afterburner fuel control device shown in FIGURE 2.

Figure 1:
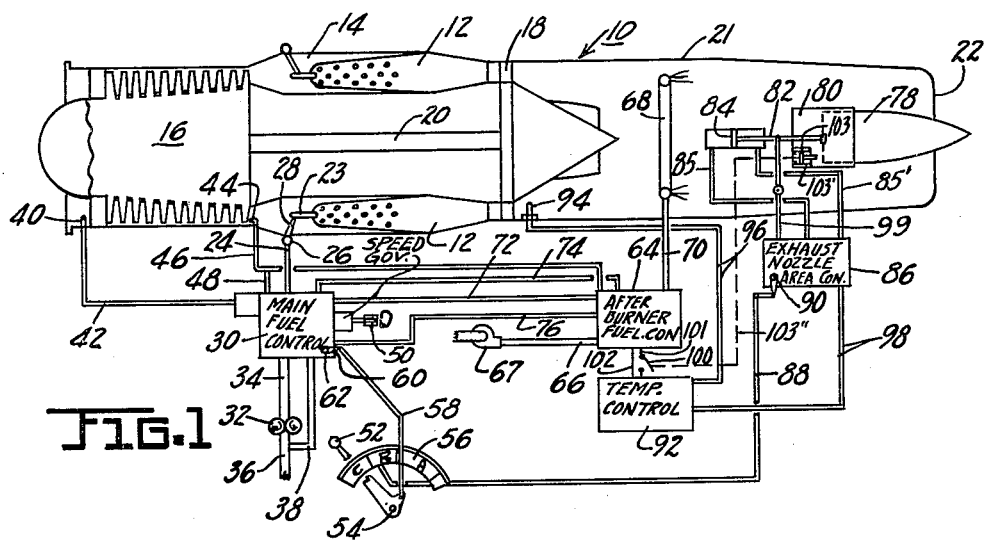
FIGURE 1 is a schematic view of a gas turbine engine equipped with a complete power control system, including an afterburning system in accordance with the present invention.

Referring now to FIGURE 1, a gas turbine engine is generally shown at 10 and includes a series of annularly disposed combustion chambers 12 mounted in a casing having a header or air intake section 14, and a compressor 16 which is driven by means of a turbine 18 through a drive shaft 20. An elongated tailpipe 21 receives the hot gases of combustion which flow through turbine 18, and conduct the gases to a variable area thrust or exhaust nozzle 22 which discharges into the atmosphere. Each of the combustion chambers is provided with a burner nozzle 23 to which metered fuel is supplied under pressure by way of a conduit 24, a fuel manifold 26 and individual fuel lines 28. The conduit 24 receives metered fuel from a fuel control device, generally indicated at 30, which is preferably of the type disclosed and claimed in copending application Serial No. 499,432, filed April 5, 1955, in the names of H. J. Williams, F. R. Rogers and B. J. Ryder (common assignee).

A pump 32 supplies fuel under pressure to the control device 30 through a conduit 34, a portion of which may be by-passed back to a pump inlet conduit 36 through a conduit 38. The fuel control 30 contains mechanism adapted to respond to compressor inlet temperature, as sensed by a temperature bulb 40 which is connected to a liquid filled bellows in fuel control 30 by a passage 42, compressor discharge pressure, picked up by a pressure tube 44 and connected to the fuel control by way of conduits 46 and 48, engine speed, which is transmitted to a splined drive shaft 50 of the control by means of suitable gearing, not shown, between shaft 50 and engine drive shaft 20, and to the position of a pilot's control lever 52, which is mounted for rotation on a shaft 54 in a pilot's control quadrant 56 and which is connected to the fuel control device by means of a linkage 58, a throttle lever 60, and a shaft 62.

An afterburner fuel control 64 receives fuel under pressure through an inlet conduit 66 from a centrifugal pump 67, metering said fuel to an afterburner manifold 68 which receives fuel from an outlet conduit 70 and discharges same into the tailpipe 21 where it combines with the unburned air in the hot gases of combustion flowing through said tailpipe to greatly increase the tailpipe temperature downstream of manifold 68, and therefore the net thrust at the exhaust nozzle 22. The pressure pick-up 44 and conduit 46 connect air at compressor discharge pressure to the afterburner fuel control, and the pilot's lever 52 is operatively connected to control 64 by means of reference pressure and throttle position pressure passages 72 and 74, respectively, such that control 64 is adapted to vary fuel flow to manifold 68 as a unique function of compressor discharge pressure and throttle position. A passage 76 communicates a hydraulic pressure from control 30 to control 64 which varies in proportion to variations in engine speed for the purpose of disallowing fuel to flow through control 64 at less than a predetermined engine speed.

The effective area of the exhaust nozzle 22 is controlled by a bullet-like valve 78 which is reciprocable within a cylindrical support member 80 and which is positioned to vary the effective area of nozzle 22 as a function of the position of pilot's lever 52 and/or tailpipe temperature by a rod 82 operatively connected by a hydraulically driven power piston 84 to an exhaust nozzle area control 86. Power piston 84 is shown in a cylinder which is adapted to receive pressurized fuel or oil by way of a conduit 85 or a conduit 85', said cylinder being shown mounted in tailpipe 21 as a matter of convenience only. Pilot's lever 52 is connected to the nozzle area control 86 by a link 88 and a lever and shaft 90 for coordinating the effective area of the exhaust nozzle 22 with power selection at the main fuel control 30 during non-afterburning operation. During non-afterburning operation an electronic amplifier and temperature control 92 responds to a turbine outlet temperature in tailpipe 21 which exceeds a predetermined maximum value, sensing same at thermocouple 94 which is connected thereto through leads 96, to signal the nozzle area control 86 through leads 98 in such a manner that the bullet-valve 78 will increase the area of nozzle 22 as necessary to maintain tailpipe temperature within the predetermined maximum limit. A positional feedback link 99 connects rod 82 to area control 86. Exhaust nozzle area and temperature control means adapted to carry out such a mode of control is fully disclosed in copending application Serial No. 454,348, filed September 7, 1954, in the names of B. S. Hegg and N. K. Peters (common assignee), now abandoned, which application is a continuation of application Serial No. 212,566, filed February 24, 1951, now abandoned. During afterburning operation the temperature control 92 alone determines the effective area of exhaust nozzle 22 through nozzle control 86 in such a manner that a constant predetermined turbine discharge temperature is maintained in the tailpipe 21 irrespective of variations in fuel flow to manifold 68 or in other engine operating conditions.

Power selection by pilot's lever 52 within quadrant sector A results in setting an all-speed governor in main control 30 between a ground idle speed and near maximum operating speed as the lever 52 sweeps the sector in a counterclockwise direction; the nozzle area control becomes effective during an acceleration of the engine to decrease the area of nozzle 22, thereby increasing the net thrust output. As pilot's lever 52 sweeps quadrant sector B in a counterclockwise direction the speed setting of the main control governor is affected very little, if at all, whereas the linkage 88 sets area control 86 so that bullet valve 78 closes nozzle area 22 to a maximum non-afterburning power condition of operation at the break point between quadrant sectors B and C. As the pilot's lever sweeps quadrant sector C in a counterclockwise direction at maximum engine speed, the afterburner fuel control 64 meters increasing quantities of fuel to manifold 68 as a function of compressor discharge pressure and pilot's lever position. During operation of the engine within the selectable power range denoted by quadrant sectors A and B, the temperature control 92 is effective to override pilot's control of nozzle area control 86 in the event of an overtemperature condition in the tailpipe 21, whereas power selection in the afterburning range, as denoted by quadrant sector C, results in continuous control of the nozzle area control 86 by temperature control 92 to maintain a predetermined constant tailpipe temperature.

The temperature control 92 may also be operatively connected to afterburner control 64 by a switch 100 and leads 101 and 102 for causing a reduction in afterburner fuel flow in the event of an overtemperature condition in the tailpipe following movement of nozzle valve 78 to a wide open position. Switch 100 may be closed to allow control 92 to effect a reduction in full flow with overtemperature, in a manner to be described, by a small spring loaded piston 103 mounted in a cylindrical guide 103′ within cylinder 80 and connected to switch 100 by a linkage 103″. The end of guide 103′ acts as a maximum area stop for nozzle valve 78, said valve 78 effecting leftward movement of piston 103 to close switch 100 when a maximum nozzle area has been reached. Secondary tailpipe temperature control may thus be provided even though valve 78 is in wide open position, at which no further overtemperature control can be provided by the operation of controls 86 and 92.

Referring now to FIGURE 2, the afterburner fuel control 64 conducts fuel from inlet conduit 66 at pressure $P_1$ to discharge conduit 70 at pressure $P_3$ by way of ports 104 in a sleeve member 106, oppositely disposed ports 108 controlled by a balanced type regulator valve 110, a $P_2$ pressure chamber 112, a passage 114, a chamber 116, a metering orifice 118 formed between an orifice member 120 and a contoured metering valve 122, a $P_3$ or metered pressure chamber 124, a conduit 126, and an opening 128 closable by a cut-off valve member 130.

The regulator valve 110 is of the constant pressure differential type, being urged in an opening direction by a regulator spring 132, which is connected to said valve by a retainer 134 and a valve stem 136 which passes through a flexible diaphragm 138, and being urged in a closing direction by a force produced by a fuel pressure differential across diaphragm 138; the said differential pressure is substantially constant for any given setting of a spring adjustment screw 140 and is continuously imposed across metering valve 122 as a result of connecting the chambers on either side of diaphragm 138 to the chambers on either side of valve 122.

A passage 142 having a fixed restriction 144 therein connects $P_2$ pressure conduit 114 to $P_3$ pressure chamber 124 by way of a servo pressure chamber 146 located on the low pressure side of a valve actuating power piston 148, and an orifice 150, the area of which may be effectively varied by a half-ball type servo valve 152 as a function of the amount of compression loading imposed on an evacuated bellows 154 which is mounted in a $P_x$ air pressure chamber 156 and which is connected to valve 152 by a bracket 158 and a lever 160 fulcrumed at 162. The lever 160 is connected to the metering valve 122 by a tension spring 164 and to an adjustable housing fixture 166 by a tension spring 168.

The compressor discharge pressure conduit 46 houses a fixed restriction 170 and terminates in a chamber 172 which is vented to the atmosphere through an opening 174, the effective area of which may be varied by a pilot controlled needle valve 176, a chamber 178, and a passage 180. A branch passage 182 connects bellows chamber 156 to conduit 46 at a point intermediate the restriction 170 and the valve 176, and is adapted to connect said chamber to the atmosphere venting passage 180 by way of a normally closed orifice 184 and a passage 186. A solenoid valve 188 normally maintains orifice 184 closed; however if an overtemperature condition should exist in the tailpipe 21 during operation at maximum area of nozzle 22, as hereinbefore explained, the temperature control 92 energizes a coil 190 through leads 101 and 102 and causes valve 188 to be drawn upwardly against a spring 192, thereby allowing chamber 156 to be vented to the atmosphere. A manually adjustable piston 194 is mounted in a chamber 196 which is connected to passage 182 for providing control of the time rate of pressure change in passage 182 following, for example, a rapid opening or closing movement of valve 176. The position of piston 194 is made adjustable in order to vary the effective volume of chamber 196, thereby making the permissible time rate of pressure change in passage 182 variable as desired.

The position of the valve 176 is controlled by the throttle lever and shaft 60 and 62 of the main fuel control 30. Within the main control 30 there is included a $P_R$ or reference pressure chamber 198 connected to a servo piston chamber 200 by the conduit 72, to the inlet side of pump 32 by conduit 38, and to a discharge passage 202 of a constant differential pressure regulator valve 204 by means of a calibrated restriction 206, a $P_T$ or throttle position reference pressure chamber 208 and a passage 210. The valve 204 is connected on the upstream side thereof to a source of high pressure fuel in control 30, and to conduit 38 by a passage 212 for maintaining a constant pressure differential between passage 202 and chamber 198 in a well known manner. The chamber 208 is connected to a servo piston chamber 214, which is separated from chamber 202 by a servo piston 216, by the conduit 74. The throttle lever and shaft 60 and 62 are connected to a half-ball servo valve 218, which controls the effective discharge area of passage 210, by a meshing rack and pinion 220 and 222, a flexible diaphragm 224 connected to said rack by a tension spring 226, and a lever 228 fulcrumed at 230.

As the pilot's lever 52 is actuated in a counterlockwise direction to increase engine power output, the rack 220 is actuated upwardly by pinion 222 to increase the tension of spring 226, thereby tending to move half-ball valve 218 to close passage 210 and increase $P_T$ pressure in chamber 208 until the hydraulic force across diaphragm 224 balances the higher spring force at the new throttle lever position. It will therefore be apparent that the pressure difference $P_T - P_R$ across servo piston 216 will vary in direct proportion to throttle lever position.

Any given fixed position of valve 176 is dependent upon an existing force balance between a leftwardly acting hydraulic differential pressure imposed on a valve actuating power piston 234, which separates a chamber 236 from a chamber 238, and the sum of the rightwardly acting forces exerted on said valve by a compression spring 240 and a tension spring 242. The tension spring 242 connects an extension 244 of piston 234 to a lever 246 fulcrumed at 248, which abuts an extension of servo piston 216 at one end thereof, and controls a half-ball servo valve 250 which is fixed to the opposite end of the lever 246. The servo valve 250 controls the effective area of a passage 252 which is connected to $P_1$ pressure conduit 66 by a conduit 254, a chamber 256, a port 258 which is controlled by a constant servo head regulator valve 260, a $P_1'$ pressure chamber 262, a passage 264 having a fixed restriction 266 therein, and the chamber 238. A branch passage 268 connects passage 264 upstream of restriction 266 to the chamber 236. A spring loaded flexible diaphragm 270 separates chamber 262 from a chamber 272, which is connected to $P_2$ pressure chamber 116 by a conduit 274, a chamber 276 and a passage 278.

The pressure differential across diaphragm 270 is always substantially constant and depends upon the loading of the diaphragm spring; the pressure in chamber 238 approaches pressure $P_1'$ as servo valve 250 is actuated in a closing direction by spring 242 following a decrease in the differential across servo piston 216, and approaches pressure $P_2$ in chamber 276 as the valve 250 is actuated in an opening direction following an advance of throttle lever 60 and a corresponding increase in the pressure drop across servo piston 216. The pressure in chamber 236 is always equal to pressure $P_1'$. Whenever the valve 176 is in a fixed position the force moment of spring 242 about fulcrum 248 is substantially equal and opposite to the force moment acting about said fulcrum at the upper end of the lever 246. This relationship always results in a fixed position of valve 176 and a fixed area of orifice 174, said position and area being proportional to the position of throttle lever 60.

From the above it will be apparent that whenever control 64 is in operation with cut-off valve 130 open, the value of control pressure $P_x$ in bellows chamber 156 will depend upon the position of valve 176 and the value of compressor discharge pressure $P_c$ in conduit 46. In other words, at any given $P_c$ pressure, $P_x$ pressure is variable over a relatively wide range and varies as a function of the position of throttle controlled valve 176, maximum $P_x$ pressure being equal to pressure $P_c$ when valve 176 closes orifice 174. Whenever pressure $P_c$ changes, as with a change in altitude of operation, it is apparent that the available range of change of pressure $P_x$ with the same range of travel of valve 176, will vary.

Pressure $P_x$ tends to compress bellows 154 and actuate lever 160 in a clockwise direction about fulcrum 162 to hold servo valve 152 in a slightly open position with respect to restriction 150. The pressure in chamber 146 below power piston 148 is always intermediate pressures $P_2$ and $P_3$ in conduit 114 and chamber 124, respectively, and approaches one or the other of said pressures depending on the relative areas between fixed restriction 144 and variable restriction 150. At any given position of metering valve 122, the valve closing force exerted by springs 164 and 168 is balanced by the downward hydraulic force across piston 148. Any change in pressure $P_x$, for example an increase therein, results in an increase in force on bellows 154, a slight opening movement of servo valve 152, a resultant increase in differential across piston 148 and opening movement of valve 122, and an increasing tension in springs 164 and 168 until the servo system is again in balance at a new open position of valve 122. It is therefore apparent that the metering area of orifice 118 will always be proportional to pressure $P_x$, and that since regulator valve 110 maintains a constant pressure drop across said orifice, afterburner fuel flow to the tailpipe 21 will always be proportional to pressure $P_x$.

A minimum afterburner flow control 280 is adapted to limit the minimum quantity of fuel which can flow to the manifold 68 at any given compressor discharge pressure. The minimum flow control 280 includes a half-ball valve 282 mounted on one end of a bell-crank 284 which is pivoted at 286 and spring loaded at 288 to urge a roller 290 toward contact with a downwardly sloping face of a cam element 292, said cam element being actuatable in either direction along a flat surface 294 by a piston 296 which is connected to said element by a spring 297. The piston 296 may be actuated by a spring loaded evacuated bellows 298 which is mounted in a chamber 300, said chamber being connected to $P_c$ pressure conduit 46 upstream of restriction 170 by means of a conduit 302. The valve 282 normally closes a passage 304 which is formed in a power piston extension 306.

Whenever valve 122 moves so far closed that roller 290 is actuated into contact with cam 292 by spring 288, a further decrease in pressure $P_x$ would not effect a proportional closing movement of valve 122, but could only cause a slight unseating of half-ball 282 with respect to the end of passage 304 so that the pressure differential across piston 148 would increase to disallow further closing movement of valve 122. The minimum afterburner fuel flow schedule may thus be selected by contouring the sloping face of cam 292 so that the minimum flow position of valve 122 at various compressor discharge pressures will always insure an adequate supply of fuel to the engine to maintain combustion in the tailpipe, irrespective of the position of throttle lever 60 and valve 176.

The cut-off valve 130 is mounted for reciprocation in a cylindrical chamber 305, is constructed as a differential area valve, contains ports 307 for connecting conduit 126 to an internal chamber 308, and defines a passage 310 for connecting chamber 308 to afterburner manifold pressure conduit 70. A pilot valve 312 is mounted in chamber 308' in axial alignment with passage 310, and is adapted to cause valve 130 to seat on orifice 128 whenever the pilot valve 312 closes passage 310 and to move in an opening direction, as shown, when valve 312 opens passage 310. The pilot valve is urged in an upward or closing direction by a spring 316 and is urged in a downward or opening direction by a first fuel pressure differential acting across a diaphragm 318 which separates chamber 320 and 322, and by a second pressure differential across a diaphragm 323 which separates chambers 324 and 325. Chambers 322 and 325 are interconnected by a passage 326 and communicate with reference pressure $P_R$ in chamber 198 by way of conduit 72. The chamber 324 is subjected to throttle position pressure $P_T$ in chamber 208, being connected thereto by conduit 74. A pressure $P_N$, which is caused to vary in relation to engine speed by an engine driven impeller 327, is communicated to chamber 320 from the main control 30 at a predetermined engine speed by the passage 76 and a pump discharge chamber 328 formed on one side of a spring loaded triggering piston 329. The inlet side of impeller 327 and the spring side of piston 329 are connected to $P_R$ pressure conduit 72 by passages 330 and 331, respectively. At a predetermined engine speed, which may be the maximum operating speed of the engine, the differential pressure acting across piston 329 moves said piston rightwardly against the spring to permit communication between chambers 320 and 328.

The loading of spring 316 is so selected that pilot valve 312 cannot move in an opening direction until a concurrence of throttle lever position in sector C of quadrant 56, and the said predetermined engine speed exists. When such predetermined conditions exist, the sum of the forces acting across diaphragms 318 and 323 overcomes spring 316 and actuates valve 312 downwardly, which results in a decrease of pressure in chamber 308 and an opening movement of cut-off valve 130 to allow metered fuel to flow to the afterburner manifold 68.

Figure 4:
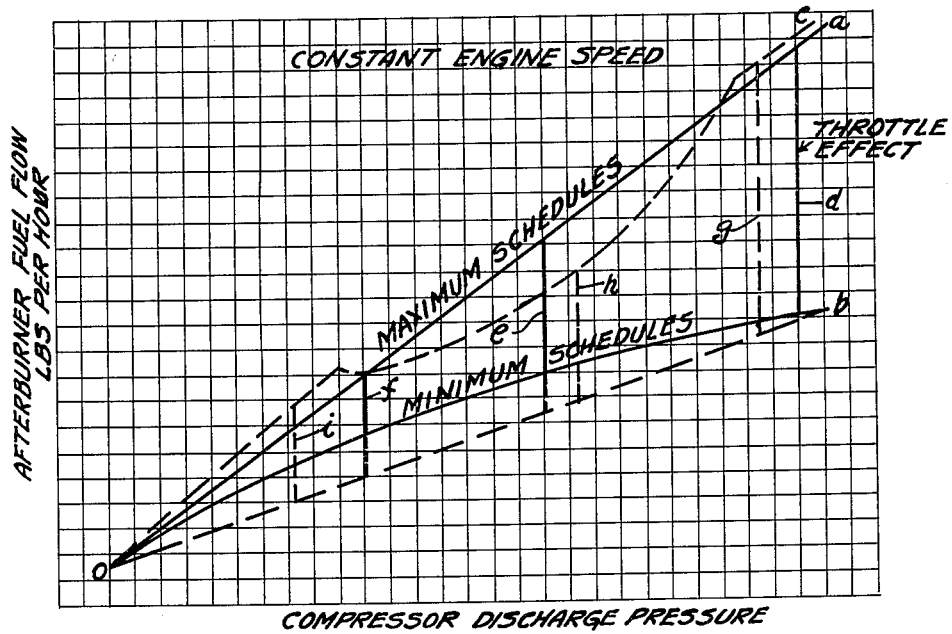
FIGURE 4 is a curve chart on which afterburner fuel flow is ploted against compressor discharge pressure for illustrating certain operating characteristics of the fuel controls shown in FIGURES 2 and 3.

Referring now to FIGURE 4 and the overall operating characteristics of the control device of FIGURE 2, mass of afterburner fuel flow is plotted against compressor discharge pressure and solid curves $oa$ and $ob$ illustrate typical maximum and minimum fuel flow versus discharge pressure schedules, respectively, producible by the fuel control device when the pilot's control lever 52 traverses quadrant sector C at a predetermined (preferably maximum) engine speed. Solid vertical lines, $d$, $e$, and $f$ indicate the effect on afterburner fuel flow to the manifold 68 at various compressor discharge pressures as the pilot's lever is actuated across quadrant sector C. For example, at a very high compressor discharge pressure such as would be obtained at sea level maximum speed operation, movement in a counterclockwise direction of the pilot's lever across sector C results in a closing movement of throttle valve 176 from a given first position to a given second position, thereby causing a gradual increase in pressure $P_x$ in bellows chamber 156 and a corresponding travel of metering valve 122 to a maximum or nearly maximum open position; this metering valve action increases afterburner fuel flow to nozzle conduit 70 and afterburner manifold 68 from the minimum schedule curve to the maximum schedule curve along line $d$. At an altitude of, say, 20,000' the maximum obtainable variation in afterburner fuel flow with the same throttle valve movement is illustrated by the line $e$. If the aircraft should be flown to, say, 40,000' the maximum obtainable variation in afterburner fuel flow with the same throttle valve movement is illustrated by the line $f$. The characteristic of the minimum schedule curve $ob$ is fixed by the effect of minimum flow control 280 on the minimum open position of metering valve 122 at each compressor discharge value, and is selected so that afterburner flame die-out cannot occur at any given value of discharge pressure. The maximum schedule characteristic $oa$ is a linear function, the slope of which may be varied as desired by varying the contour of throttle needle valve 176, or by varying the size of restriction 170. The slope of the maximum schedule is chosen so that substantially all of the unburned air flowing into the tailpipe section is burned in the afterburner at each given compressor discharge pressure value so that net thrust is augmented to the maximum possible extent.

Turbine discharge temperature control is normally provided by exhaust nozzle area and temperature controls 86 and 92. These latter controls are normally effective at all times during afterburning operation to control the bullet valve 78 so as to increase or decrease the area of exhaust nozzle 22 as necessary to maintain a preselected temperature at thermocouple 94. Secondary overtemperature protective means is afforded by afterburner control solenoid valve 188, 190, which opens orifice 184, under a condition hereinbefore described, in the event of an overtemperature condition at thermocouple 94 to vent pressure $P_x$ to pressure $P_a$ through by-pass passage 186, thereby permitting a decrease in afterburner fuel flow, and a resulting decrease in tailpipe temperature to the reference temperature value, irrespective of the flow demanded by the pilot through the operation of the valve 176.

From the above it is apparent that the afterburner flow control pressure $P_x$ is always proportional to compressor discharge pressure $P_c$, but that changes in the position of the pilot's lever will vary the ratio between pressures $P_x$ and $P_c$.

During afterburner operation it is preferred that the speed setting of a governor in main control 30 be fixed so that engine speed is maintained at a constant value irrespective of variations in operation, as illustrated on the curve chart of FIGURE 4.

A modification of the arrangement shown in FIGURE 2, wherein throttle valve 176 is mechanically connected to throttle lever 60 by a three dimensional cam arrangement made rotatable by actuation of the throttle lever and axially movable by an evacuated bellows means responsive to compressor discharge pressure, will now become readily apparent to those skilled in the art. Such a cam could be mounted in transverse relation to valve 176 and contoured in three dimensions so that manual rotation thereof would produce the curves $d$, $e$ and $f$ as the compressor pressure responsive bellows actuated the cam in an axial direction with decreasing compressor discharge pressure.

Referring now to FIGURE 3, a substantial modification of the control arrangement shown in FIGURE 2 is disclosed wherein a metering valve 340 is urged in a closing direction relative to a metering port 342 by a spring 344, and is mechanically connected to a pilot's throttle lever by a stem and abutment plate 346, 348, a movable roller 350 in registry with a track 352 of plate 348, and a rod, bell crank and throttle link 354, 356 and 358, respectively. The connection to the pilot's throttle lever is shown in simple form; in practice it comprises a hydraulically actuated travel type servo-mechanism for reducing the effort required by the pilot to actuate roller 350 in track 352. A flexible diaphragm 360 is mounted in a control casting 362 and is sealingly and slideably connected to rod 354 to permit generally upward movement of roller 350 along a surface of an incline plane member 364 when the bell crank 356 is actuated in a counterclockwise direction by link 358. The slope of member 364 is at all times determined by the contour and angular position of a maximum fuel flow scheduling cam 366 which abuts the lower end of member 364 by a rod 368, and a minimum fuel flow scheduling cam 370 pivotally connected to the upper end of member 364 by a rod 372, said maximum and minimum scheduling cams being mounted for simultaneous rotation with a shaft member 374 having a pinion 376 mounted thereon in mesh with a rack 378 which is coupled at 380 to a hydraulically driven power piston 382.

The power piston 382 is mounted for reciprocation in a cylinder 384 which is vented at the left end thereof to a metered fuel pressure ($P_3$) chamber 386 through passages 388 in an end plate member 390, and which is connected at the right end thereof with unmetered fuel pressure $P_2$ upstream of valve 340 by means of a passage 392 having a fixed restriction 394 therein, and with $P_3$ pressure chamber 386 through said passage 392 and a variable restriction at the one end of said passage which is controlled by a half-ball servo valve 396. An evacuated low spring rate bellows 398 is mounted in a casting chamber 400 which is connected to the compressor pressure discharge section by passage 46, said bellows being connected to servo valve 396 by a link 402 and a lever 404 fulcrumed at 406, and said lever being connected to the casting 362 by a tension spring 408 and to a power piston rod 410 by a tension spring 412.

The operation of the servo mechanism for controlling the position of power piston 382, including $P_c$ pressure bellows 398, servo valve 396, and tension springs 408 and 412, is basically the same as the servo mechanism which controls metering valve 122 in FIGURE 2. Any given $P_c$ pressure in chamber 400 results in a force moment about fulcrum 406 which is balanced by the resultant force moment of springs 408 and 412 about the fulcrum, thereby fixing a position of piston 382 in cylinder 384 which is a linear function of the pressure in chamber 400. If the pressure in chamber 400 should increase, as with a decrease in altitude of operation, the resulting unbalance of force moments momentarily moves servo valve 396 towards the end of passage 392 and increases pressure $P_{2-3}$ in chamber 414 to actuate piston 382 leftwardly until the increasing resultant force moment of springs 408 and 412 balances the force moment of bellows 398, at which time the leftward acting force on piston 382 is equal to the rightward acting force resulting from pressure $P_3$ in chamber 416 and the force output of spring 412. It is apparent that the quantum of leftward movement of piston 382 is directly proportional to the increase in pressure $P_c$. This movement actuates the cams 366 and 370 in a clockwise direction with shaft 374, as viewed from the lower end of said shaft, said cams being so contoured that the slope or inclination of member 364 is increased as a predetermined function of the increase in $P_c$ pressure. A decrease in pressure $P_c$ results in the opposite effect; i.e. the cams 366 and 370 are actuated in a counterclockwise direction, the contour of said cams being such that the slope or inclination of member 364 is decreased relative to rod 354.

At any given slope of member 364 the pilot may actuate rod 354 and roller 350 between limits defined by the ends of member 364. As shown, the pilot is demanding an afterburner fuel flow at the maximum limit for a particular $P_c$ pressure. Should the pilot retract the throttle lever from this setting to demand a lesser afterburner fuel flow at said $P_c$ pressure, the roller 350 will be actuated upwardly along the slope of member 364 and the spring 344 will maintain contact between said roller and the abutment 348, thereby driving metering valve 340 in a closing direction to decrease fuel flow as a predetermined function of pressure $P_c$.

From the above it is apparent that any desired afterburner fuel flow schedule may be realized by contouring the maximum and minimum flow scheduling cams as a desired predetermined function of pressure $P_c$. In other words, with a varying compressor discharge pressure the total range of available afterburner fuel flow may be varied as desired, depending on the contours of the maximum and minimum cams.

A pressure differential regulator section 415 is provided to maintain a substantially constant pressure head across metering valve 340, being connected to the $P_2$ and $P_3$ pressure chambers by chambers formed on opposite sides of the flexible diaphragm 138'. All parts are similar to those provided for controlling regulator valve 110 of FIGURE 2, and have been denoted by the same numerals followed by a prime notation.

A diagrammatically illustrated overtemperature limiter valve 416 is the functional equivalent of solenoid valve 188, 190, of FIGURE 2, and permits the pressure in chamber 400 to be vented to the atmosphere through a passage 418 whenever an overtemperature condition exists in the tailpipe 21 following actuation of nozzle valve 78 to a wide open position.

A fuel cut-off valve member like that provided in the control mechanism of FIGURE 2 may be provided in the discharge conduit 70 of FIGURE 3, and is diagrammatically shown at numeral 420; it permits flow of afterburning fuel to the tailpipe only after the pilot's lever is placed in a predetermined high power position, and only after engine speed has attained a predetermined value.

The overall operation of the control device shown in FIGURE 3 is illustrated by the dotted minimum and maximum fuel schedule curves $ob$ and $oc$ in FIGURE 4, between which curves the pilot may vary fuel flow at any given compressor discharge pressure, as illustrated by dotted vertical lines $g$, $h$ and $i$. The control device of FIGURE 3 is the functional equivalent of the FIGURE 2 device, except that the arrangement of FIGURE 3 provides for substantially more flexibility in selection of the particular maximum and minimum fuel flow schedules which may be desired. This great flexibility is provided by the contouring of the maximum and minimum flow schedule cams, which may be varied as desired.

This invention contemplates the use of known types of servomechanisms wherever needed to provide power operation.

Although only two embodiments of my invention have been schematically illustrated and described, it will be apparent to those skilled in the art that various changes in the structure and relative arrangement of parts may be made to suit individual requirements without departing from the scope of the invention.

I claim:

1. In an afterburning or thrust augmentation system for a gas turbine engine having a compressor, a turbine for driving the compressor, and a tailpipe section downstream of the turbine, a fuel conduit for delivering fuel to the tailpipe section, valve means for controlling the flow of fuel through said conduit, a floating inclined plane member located in spaced relationship with said valve means, means responsive to a pressure generated by said compressor and connected to said inclined plane member for varying the spaced relationship and inclination of said inclined plane member with respect to said valve means as a function of said compressor generated pressure, and a manually positionable member forming a connection between said inclined plane member and said valve means to control the flow regulating position of said valve means as a function of the position of said inclined member and said manually positionable member.

2. A thrust augmenting system as claimed in claim 1 wherein tailpipe temperature limiting means are provided for reducing the pressure acting on said means responsive to pressure and reduce the fuel supplied to said tailpipe section when a predetermined limiting tailpipe temperature is exceeded.

3. A thrust augmenting system as claimed in claim 1 wherein speed responsive means are provided to prevent flow of fuel through said conduit when engine speed is below a predetermined value.

4. A thrust augmenting system as claimed in claim 1 wherein throttle responsive means are provided to prevent flow of fuel through said conduit when the throttle setting is less than the predetermined value.

5. A fuel control device for gas turbine engines having a compressor, a turbine for driving the compressor, and a combustion section, a fuel conduit for delivering fuel to said combustion section, valve means for controlling the flow of fuel through said conduit, a first and second cam member positioned in response to a pressure generated by said compressor, said first and second cams having contours representative of minimum and maximum fuel flow limits respectively, an inclined member movable relative to said first and second cam members having a surface and a first end positioned by said first cam member and a second end positioned by said second cam member, such that said surface is positioned to represent a fuel flow schedule between said maximum and minimum flow limits that is variable as a function of said compressor generated pressure, a manually positionable member contacting said surface and said valve means to select a flow controlling position for said valve means that is a function of the position of said inclined member and said manually positionable member.

6. In a fuel control device for a combustion engine having a combustion section, and means for supplying fuel to said combustion section, valve means operative with aforesaid means and positionable to control the rate at which fuel is supplied to said combustion section, a floating member having a surface inclined with respect to said valve means, a manually controlled member connectively interposed between said inclined surface and said valve means to select a position for said valve means within a range of positions provided by said inclined surface, cam means responsive to an operating air pressure of said engine, said floating member being movable relative to said cam means and positioned thereby to vary said range of positions provided by said inclined surface.

7. In a fuel control device as claimed in claim 5 wherein said combustion engine also has a compressor and said operating air pressure of said engine has a compressor generated air pressure.

8. In a fuel control device as claimed in claim 5 wherein pressure head regulating means are provided to control the pressure differential across said valve means.

9. Apparatus for combining position signals to produce an output position signal comprising: an output plate member; a rotatable shaft; first and second cam members fixedly secured to said shaft at a fixed spaced distance with respect to each other; a first position input member connected to said shaft for rotating said shaft in response to a first input signal; an inclined member having a surface and a first end positioned by said first cam member and a second end positioned by said second cam member; a second position input member contacting said output plate member and movable across the surface of said inclined member in response to a second input signal and spring means operative with said output plate member to bias said plate member against said second input member.

10. Apparatus as claimed in claim 9 wherein said first and second cam members have different contours formed thereon.

11. In an afterburner fuel control for a gas turbine engine having an afterburner fuel manifold and conduit means for supplying fuel to said manifold; valve means operative with said conduit means and positionable along one axis of movement to control the rate at which fuel is supplied to said afterburner manifold, an abutment plate secured to one end of said valve means having a surface substantially perpendicular to the axis of movement of said valve means, a floating member having a surface inclined with respect to said abutment plate, a manually controlled member connectively interposed between the surfaces of said abutment plate and said floating member to select a position for said valve means within a range of positions provided by said inclined surface, cam means responsive to an operating air pressure of said engine, said floating member being movable relative to said cam means and positioned thereby to vary said range of positions provided by said inclined surface.

12. In an afterburner fuel control as claimed in claim 11 wherein said gas turbine engine includes a compressor and said cam means is responsive to engine compressor discharge pressure.

13. In an afterburner fuel control as claimed in claim 11 including a spring member producing a force acting on another end of said valve means tending to urge said abutment plate and said manually controlled member into contactive engagement.

14. In an afterburner fuel control for a gas turbine engine having a compressor, an afterburner fuel manifold, and conduit means for supplying fuel to said manifold; valve means operative with said conduit means and positionable to control the rate at which fuel is supplied to said afterburner manifold, a floating member having a first and second end and an inclined surface intermediate said ends inclined with respect to said valve means, a manually controlled member connectively interposed between said inclined surface and said valve means to select a position for said valve means within a range of positions provided by said inclined surface, spring means producing force on said valve means to urge said valve means and said manually controlled member into contactive engagement, first and second movable rods operative respectively to position said first and second ends of said floating member, cam means responsive in position to discharge pressure from said compressor operative with said first movable rod to control the position thereof and thereby vary the position of said floating member relative to said cam means, and means for controlling the position of said second movable rod and thereby vary the position of said floating member.

15. In an afterburner fuel control as claimed in claim 14 wherein said first rod is pivotably secured to said first end of said floating member and said second rod abuts said second end of said floating member such that sliding relative movement is presented between said first rod and said floating member and is permitted between said second rod and said floating member.

16. In an afterburner fuel control for a gas turbine engine having a compressor, an afterburner fuel manifold, and conduit means for supplying fuel to said manifold; valve means operative with said conduit means and positionable to control the rate at which fuel is supplied to said afterburner manifold, a floating lever having a first and second end and an inclined surface intermediate said ends inclined with respect to said valve means, a manually controlled member connectively interposed between said inclined surface and said valve means to select a position for said valve means within a range of positions provided by said inclined surface, spring means producing a force on said valve means to urge said valve means and said manually controlled member into contactive engagement, first and second movable members operative respectively to position said first and second ends of said floating lever, a first cam member contactively engaging said first movable member and operative to control the position thereof in response to cam movement, a second cam member contactively engaging said second movable member and operative to control the position thereof in response to cam movement, and means responsive to discharge pressure of said compressor operative to control the position of at least one of said first and second cam members.

17. In an afterburner fuel control as claimed in claim 16 wherein said means responsive to discharge pressure is comprised of a pressure sensing member, and a hydraulic servo device controlled by said pressure sensing member and connected to at least one of said first and second cam members to control the position thereof.

18. In an afterburner fuel control as claimed in claim 17 wherein said hydraulic servo device includes a pivoted lever positioned by said pressure sensing member, a servo valve controlled by said pivoted lever, a hydraulically driven power piston connected to at least one of said first and second cam members and controlled by said servo valve.

19. In an afterburner fuel control as claimed in claim 18 wherein said hydraulic servo device further includes a spring member interconnected between said pivoted lever and said power piston to provide a balancing force on said pivoted lever that varies in response to power piston movement.

20. In an afterburner fuel control as claimed in claim 17 wherein said pressure sensing member is comprised of a housing having an air chamber formed therein, a bellows member disposed in said chamber and fixedly secured on one end to said housing and connected on the other end to said pivoted lever, and conduit means transmitting discharge pressure from said compressor to said bellows member.

21. In an afterburning or thrust augmentation system for gas turbine engines having a compressor, a turbine for driving the compressor, and a tailpipe section downstream of the turbine, a fuel conduit for delivering fuel to the tailpipe section, valve means for controlling the flow of fuel through said conduit, manually operable control means including a throttle lever operatively connected to said valve means for selecting a flow controlling position thereof within a range of valve flow controlling positions, means responsive to a pressure generated by said compressor connected to said valve means for varying the valve flow controlling positions selectable by said manual means within said range of valve flow controlling positions as a function of said compressor generated pressure, said manual means being at all times operative to control said valve position, and fuel cut-off valve means provided in said conduit, said cut-off valve being responsive to a predetermined engine speed and to a predetermined position of said throttle lever for initiating a flow of fuel through said conduit.

References Cited in the file of this patent
UNITED STATES PATENTS 2,319,336    McCullough  _____ May 18, 1943

(Other references on following page)

UNITED STATES PATENTS

| | | |
|---|---|---|
| 2,486,816 | Beeh | Nov. 1, 1949 |
| 2,498,939 | Bobier | Feb. 28, 1950 |
| 2,499,232 | Strub | Feb. 28, 1950 |
| 2,570,591 | Price | Oct. 9, 1951 |
| 2,638,742 | Carey | May 19, 1953 |
| 2,658,566 | Wirth et al. | Nov. 10, 1953 |
| 2,689,606 | Mock | Sept. 21, 1954 |
| 2,691,268 | Prentiss | Oct. 12, 1954 |
| 2,700,275 | Chandler et al. | Jan. 25, 1955 |
| 2,700,872 | Lee | Feb. 1, 1955 |
| 2,720,751 | Kunz | Oct. 18, 1955 |
| 2,737,252 | Knapp et al. | Mar. 6, 1956 |
| 2,746,242 | Reed | May 22, 1956 |
| 2,778,191 | Thompson | Jan. 22, 1957 |
| 2,779,422 | Dolza et al. | Jan. 29, 1957 |
| 2,811,830 | Gartner | Nov. 5, 1957 |
| 2,830,436 | Coar | Apr. 15, 1958 |
| 2,931,168 | Alexander et al. | Apr. 5, 1960 |

FOREIGN PATENTS

| | | |
|---|---|---|
| 1,061,753 | France | Dec. 2, 1953 |